United States Patent [19]

Straube et al.

[11] Patent Number: 4,638,960
[45] Date of Patent: Jan. 27, 1987

[54] METHOD AND APPARATUS FOR DETERMINING ICE BOUNDARY TEMPERATURE FOR THE DE-ICING SYSTEM OF AN AIRCRAFT

[75] Inventors: Axel Straube, Uetersen; Hans Loos, Holm, both of Fed. Rep. of Germany

[73] Assignee: Licentia Patent-Verwaltungs-GmbH, Fed. Rep. of Germany

[21] Appl. No.: 709,505

[22] Filed: Mar. 8, 1985

[30] Foreign Application Priority Data

Oct. 11, 1984 [DE] Fed. Rep. of Germany ....... 3437304

[51] Int. Cl.$^4$ ............................................... B64D 15/12
[52] U.S. Cl. ............................ 244/134 D; 244/134 F; 219/497
[58] Field of Search ........... 244/134 R, 134 D, 134 F; 374/21, 185; 340/962; 219/203, 497, 504, 505, 486, 494

[56] References Cited

U.S. PATENT DOCUMENTS 2,767,294 10/1956 Fraser et al. ..................... 244/134 F
3,277,459 10/1966 Werner ............................ 244/134 F
4,514,619 4/1985 Kugelman ....................... 244/134 D

FOREIGN PATENT DOCUMENTS 2443224 3/1976 Fed. Rep. of Germany ... 244/134 D
2801938 7/1979 Fed. Rep. of Germany ...... 374/185
709959 1/1980 U.S.S.R. ............................... 374/185

Primary Examiner—Sherman D. Basinger
Assistant Examiner—Rodney Corl
Attorney, Agent, or Firm—McGlew and Tuttle

[57] ABSTRACT

A method of determining the temperature, preferably the ice boundary temperature, of an electrical resistive heating element of a de-icing system for airplanes, helicopters, and the like, preferably for a fully automatic control of the heating times of the heating elements. Additional temperature sensors are avoided and circuitry costs are substantially reduced by using the resistive heating elements themselves for determining the temperature. The resistance variation due to temperature variations of an element is ascertained by a current-voltage measurement, and a temperature variation of the element is determined from the resistance variation while using the temperature coefficient. The current-voltage measurement may be based on Ohm's law with a following analog or digital processing of the signal.

14 Claims, 2 Drawing Figures

METHOD AND APPARATUS FOR DETERMINING ICE BOUNDARY TEMPERATURE FOR THE DE-ICING SYSTEM OF AN AIRCRAFT

The present invention relates in general to aircraft deicing equipment, and in particular to a new and useful method and apparatus for determining the temperature, in particular the ice boundary temperature, for an electrical resistive heating element of a de-icing system in airplanes, helicoptors and the like.

It is known that to optimize the heating control, electrothermal methods for cyclically de-icing, for example, the engine inlets and/or rotorblades, the control systems of aircraft and the like, require information on the temperature at the boundary between the surface to be de-iced and the ice accretion. No departure from a predetermined temperature range must be allowed. While exceeding such a range, running back water leads to an uncontrolled ice growth on non-de-iced surfaces. Also, surface structures may thereby become excessively heated, with the result that adhesives or resin bonds are weakened. This can lead to the destruction of heating blankets and/or airfoil structure of the aircraft.

A failure to reach this temperature range does not allow the ice at the boundary to melt off, so that the accreted ice layer cannot break away.

In both instances, the aerodynamic conditions are changed and equilibrium is lost, which considerably impairs flight performance. Unbalanced rotary blades or wings may even destroy the craft.

German Pat. No. 24 43 224 discloses a method that provides a heating power supply to resistive heating elements. The heating time of the heating elements is controlled as a function of the temperature of the heating elements measured by means of temperature sensors. Since a cyclical de-icing always provides a series of heating elements, and each individual element must be controlled to have the required temperature, the needed temperature sensors, their mounting, the circuitry, and electronic evaluation represent considerable additional costs. The costs are further increased in rotary wing crafts where the evaluated temperature information must be transmitted to the power control unit through the heating lines, by means of coded electrical signals. Another drawback is that limits are set on the miniaturization of temperature sensors and their connecting lines, so that these elements protruding from the faired contours impair the aerodynamic profile and worsen the icing problem in these regions.

SUMMARY OF THE INVENTION

The present invention is directed to a method and circuit arrangement which does not use additional temperature sensors, and which thus substantially reduces the cost of the system.

An object of the present invention is to provide a method for determining the temperature, and preferably the ice boundary temperature, of an electrical resistive heating element in any de-icing system for airplanes, helicopters and the like, which yields a fully automatic control of heating times for the resistive heating element, and wherein the resistive heating element itself is employed for determining the temperature in a way such that the current-voltage measurement is provided to determine the resistance variation caused by a temperature variation of the heating element, while using the temperature coefficient of the heating element to obtain the temperature of the element from the resistance variation.

A still further object of the invention is to provide a circuit for determining the temperature of a heating element in aircraft de-icing equipment which comprises voltage and current measuring devices each for yielding a voltage corresponding to the instantaneously measured current and voltage passing through the heating element, a comparator for comparing the voltage signals and control logic connected to the comparator indicating when a predetermined switching threshold has been reached whereupon power is shut off to the heating element.

The absence of additional temperature sensors advantageously improves the aerodynamic properties of the aircraft, as compared to the prior art. Another advantage is that what is measured is not the temperature of a certain spot on the resistive heating element, but virtually the average temperature of the entire element.

Accordingly another object of the invention is to provide an apparatus for determining temperature in de-icing equipment for aircraft which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
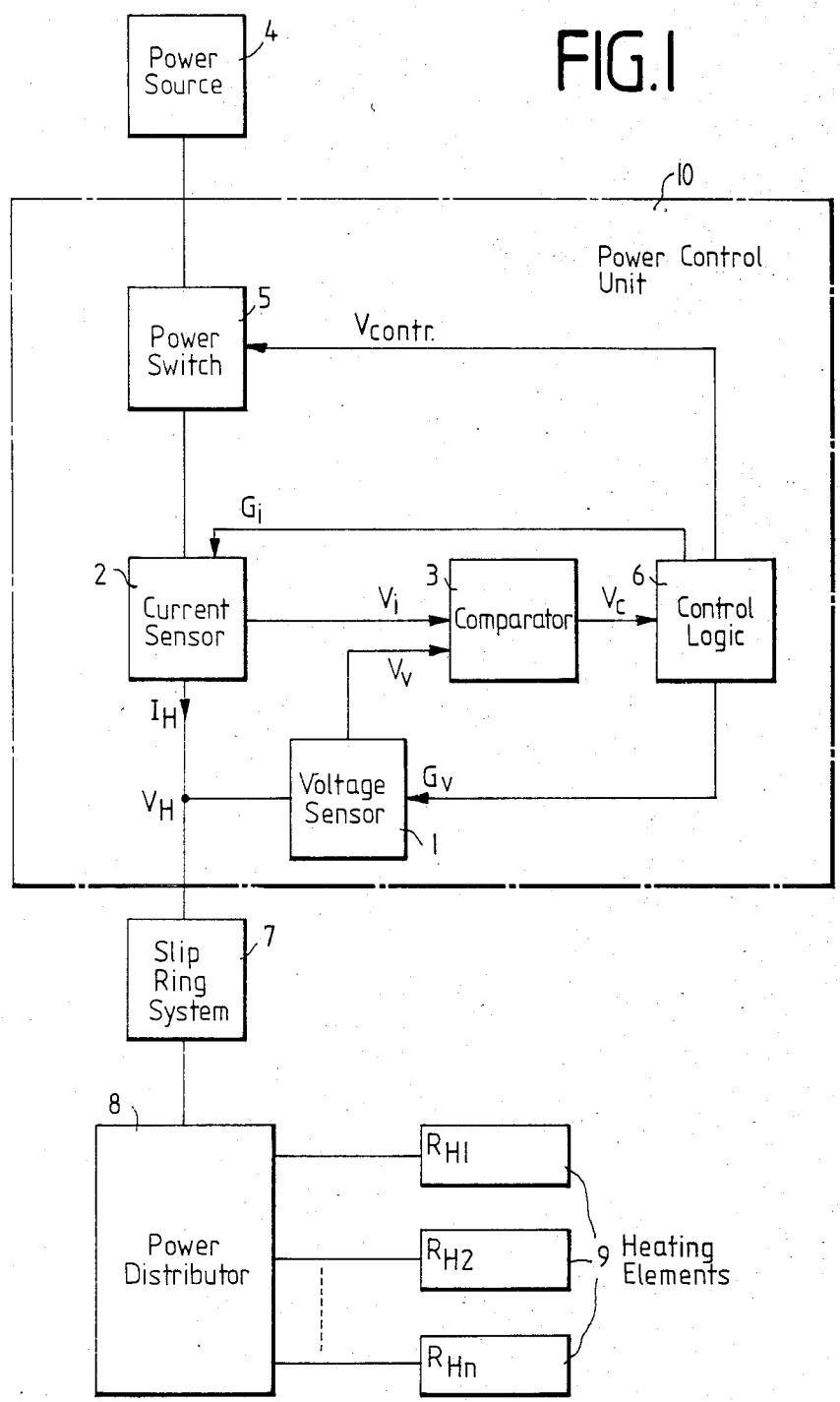
FIG. 1 is a block diagram showing one embodiment of the invention for executing a cyclic de-icing operation and process for measuring a temperature threshold for de-icing equipment.

Referring to the drawings in particular, the invention embodied therein comprises circuitry for determining the ice boundary temperature of electrical resistive heating elements in aircraft de-icing equipment.

A power source 4 supplies the electric energy needed for electrothermal de-icing. In accordance with the instructions from a control logic 6, a power switch 5 switches the power to a power distributor 8, until a predetermined temperature threshold is reached. Rotary wing crafts require in addition, a slip ring system 7 for transmitting the electric power from the craft body to the rotor blades. Power distributor 8 distributes the electric energy sequentially to a plurality of n resistive heating elements 9 which are mounted on the surfaces to be de-iced. In a system for a craft with fixed wings, the power distributor 8 is preferably accommodated in the power control unit 10.

The temperature is measured by means of functional units 1, 2 and 3. The voltage sensor produces a voltage signal $V_v$ which is proportional to the instantaneous voltage $V_H$ of the heating element. The voltage sensor 1 comprises a resistance divider $R_1$, $R_2$ and an operational amplifier A1 which is designed as a voltage follower. The sensor produces a voltage signal $V_v$ which is proportional to the heating element voltage $V_H$. The amplification factor or gain $G_v$ of voltage sensor 1 can be adjusted by means of variable resistor R2. A current sensor 2, following the power switch 5, produces at the same time a voltage signal $V_1$ which is proportional to the current $I_H$ flowing into heating element 9. The current sensor measures the heating element current $I_H$ through a measuring resistor R3 and transforms it to a voltage. A feed-back amplifier stage A2 amplifies this voltage to an output signal $V_i$. The gain $G_i$ of current sensor 2 can be adjusted by means of a resistor R5 (shown as resistors R5/1, R5/2 to R5/n), whose resistances R5/1 to R5/n are connected to the associated heating element resistances $R_{H1}$ to $R_{Hn}$ in element 9. The points 1A, 1B and 1n are connected to close switches S8/1, S8/2 and S8/n of the power distributor 8. The two voltage signals $V_v$ and $V_i$ are compared to each other by means of a comparator 3. If the voltages are equal to each other, comparator 3 produces an output signal $V_c$. With the equality of the two signals, the resistance of the heating element equals the product of resistance R3 and the gain ratio of the voltage and current sensors:

$$R_H = R3 \frac{G_v \cdot V_v}{G_i \cdot V_i} \quad (1)$$

$$V_v = V_i \quad (2)$$

Comparator output signal $V_c$ is an indication for the control logic 6 that the predetermined resistance switch threshold has been reached, so that the heating must be interrupted. Control logic 6 controls the gains $G_v$, $G_i$ of the voltage and current sensor, needed for the predetermined switch-off temperature threshold, and produces a control signal $V_{contr}$ for actuating power switch 5. Gains $G_v$ and $G_i$ determine the switch-off resistance and thus the switch-off temperature of heater element 9. By varying one or both of the amplification factors in a controlled manner, any switch-off temperature can be adjusted.

Equations (1) and (2) state that upon comparing the output voltages of the sensors, comparator 3 produces an output signal if the heating element resistance $R_H$, which is predetermined by the amplification factors and the current measuring resistor R3, is exceeded, or not reached. By controlling the amplification factors, this signal can be obtained for any desired resistance. Should it be necessary to detect many resistances of various load resistors one after the other, as it occurs in a cyclical de-icing process, advantageously only the gain of the current sensor, or of the voltage sensor, is controlled, while the gain of the other of the two sensors is fixed.

Figure 2:
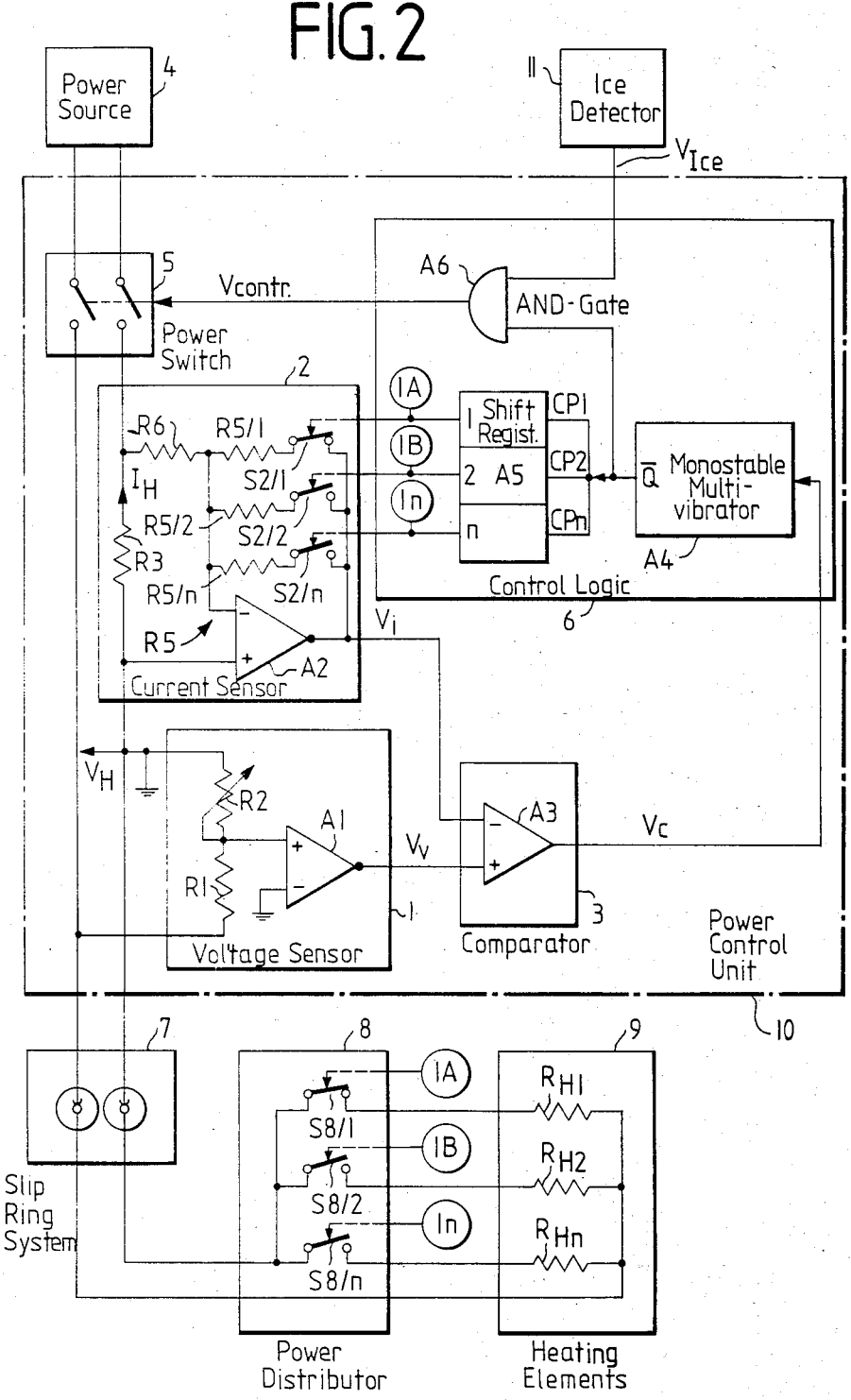
FIG. 2 is a schematic diagram showing further details of the embodiment of FIG. 1.

One de-icing cycle, with a control of the current sensor gain taken as example, is described in the following while referring to FIG. 2.

An ice detector 11 produces a voltage signal $V_{ice}$ as soon as a definite ice layer has grown up on the surfaces to be de-iced, and switches the electric power on, by means of power switch 5, through slip ring 7, from generator or power supply 4 to power distributor 8. The shift register A5 in control logic 6 is in position 1, i.e. switch S 8/1 of the power distributor and gain switch S 2/1 of the current sensor are connected by shift register A5. Heating element $R_{H1}$ is under a voltage $V_H$ and conducts a current $I_H$. Voltage sensor I produces a voltage signal $V_v$ which is proportional to voltage $V_H$ of the heating element, and current sensor 2 produces a voltage signal $V_i$ which is proportional to the current $I_H$ of the heating element. Assuming the temperature coefficient of heating element $R_{H1}$ is positive, and that the output temperature of the heating element is still below the switch-off threshold, the signal voltage $V_i$ of the current sensor exceeds the signal voltage $V_H$ of the voltage sensor. A "low" signal is produced at the output of comparator 3.

The current in heating element $R_{H1}$ heats the element and thus increased the resistance thereof. As a result, current $I_H$ decreases, and so does voltage signal $V_i$. As soon as the temperature of the heating element has risen to the switch-off threshold, the output signals $V_i$ and $V_v$ become equal to each other. Comparator 3 changes its output signal from "low" to "high" ($V_c$) and triggers then a singleshot multivibrator A4. Multivibrator A4 generates a negative voltage pulse whereby, through an AND gate A6, power switch 5 is opened for the pulse duration t and heating current $I_H$ is interrupted. The positive edge of the pulse triggers a shift of register A5, so that output 2 of A5 is set to "high". This output switches switch S8/2 of the power distributor 8 and gain switch S2/2 of the current sensor 2 to conduction, so that heating element $R_{H2}$ and the associated switch-off resistance are selected. With the expiration of the voltage pulse of A4, power switch 5 closes and again voltage $V_H$ is applied to the selected heating element $R_{H2}$. This selected heating element $R_{H2}$ remains connected up to reaching the temperature threshold (resistance threshold) where it is switched off, and this cycle is repeated for all the following heating elements up to In summary, the circuitry shown in the figures is well capable of carrying out the inventive method. By means of a voltage-current measurement, the temperature dependent varying resistance of a heating element 9 is ascertained, and while taking into account the temperature coefficient, the temperature of the element is determined therefrom. The voltage-current measurement is based on Ohm's law, and is followed by a digital or analog signal processing. The temperature of the boundary surface of the ice layer can be prevented from departing from the predetermined range by controlling the temperature of the resistive heating element 9 through the measured temperature values. The operation may be controlled by a microprocessor having the program stored in its peripheral components.

The measured temperature value may also be utilized to avoid undue high heating of heating elements 9 which would reduce the strength of glued structures, or to control an intentional temperature increase, preferably to loosen or detach glued connections. Also, the short measuring pulses (pulse mode), or an uninterrupted measuring current, may be utilized for monitoring the switch-on temperature of the heating elements, for example in an on-off controller design.

While a specific embodiment of the invention has been shown and described in detail to illustrate the application of the principles of the invention, it will be understood that the invention may be embodied otherwise without departing from such principles.

What is claimed is:

1. A method for determining the temperatures for an aircraft de-icing system having a power supply connectable to at least one resistive heating element for supplying current and voltage thereto, the resistive heating element having a known temperature coefficient, comprising:

measuring the voltage supplied to the heating element;

measuring the current supplied to the heating element;

using the measured voltage and current to determine a resistance variation in the heating element due to a temperature variation thereof; and using the temperature coefficient to determine the temperature of the heating element.

2. A method according to claim 1, using Ohm's law to determine the temperature of the heating element using analog signal processing.

3. A method according to claim 1, using Ohm's law to determine the temperature of the heating element using digital signal processing.

4. A method according to claim 1, including selecting a threshold temperature for the heating element and controlling the heating element by disrupting power thereto when the determined temperature of the heating element reaches the threshold temperature.

5. A method according to claim 1, including using the determined temperature of the heating element to control the temperature of the heating element.

6. A method according to claim 5, wherein the temperature control is used to prevent unacceptable high temperatures to bonding areas of the aircraft in order to maintain the mechanical properties of bonding material in the bonding areas.

7. A method according to claim 1, including a permanent measuring current supplied to the heating element.

8. A method according to claim 1, including applying power to the resistive heating element from the power supply in the form of power pulses, the voltage and current being measured during each power pulse.

9. An apparatus for determining the temperature of a resistive heating element having a temperature coefficient, comprising:

at least one resistive heating element;

a power supply connectable to said heating element for supplying a powering voltage and powering current to said heating element;

a controllable power switch connected between said power supply and said heating element for interrupting voltage and current supplied to said heating element;

a voltage sensor connected to said heating element for generating a voltage signal which is proportional to an instantaneous voltage supplied by said power supply to said heating element;

a current sensor connected to said heating element for generating a current signal which is proportional to instantaneous current supplied to said heating element by said power supply;

a comparator connected to said voltage and current sensors for comparing said voltage and current signals and for generating a difference signal corresponding to a difference between said voltage signal and said current signal; and logic means including a predetermined switch threshold, said switching threshold corresponding to a desired temperature of said heating element, said difference signal corresponding to said switching threshold when said heating element reaches the desired temperature.

10. An apparatus according to claim 9 wherein said logic means is connected to said power switch for opening said power switch to interrupt power from said power supply to said heating element when said difference signal corresponds to said switching threshold.

11. An apparatus according to claim 9, wherein said voltage sensor includes a first amplifier with a first gain for generating said voltage signal, said current sensor including a second amplifier with a second gain for generating said current signal, said logic means connected to said first and second amplifiers for controlling said first and second gains for changing said predetermined switching threshold.

12. An apparatus according to claim 11, wherein said logic means is connected to said power switch for interrupting said power switch when said voltage signal meets said switching threshold.

13. An apparatus according to claim 9, including at least one additional heating element connectable over said power switch to said power supply, a power distributor connected between said power supply and said first mentioned and additional heating elements for supplying power to one of said first mentioned and additional heating elements at a time.

14. An apparatus according to claim 13 wherein said current sensor includes a separate sensing resistor for each of said first mentioned and additional heating elements, said logic means including a selector for selecting a resistance in said current sensor corresponding to the one heating element being supplied with power by said power distributor.

* * * * *